United States Patent [19]

Le Jeune

[11] 4,198,440
[45] Apr. 15, 1980

[54] FOOD AND METHOD FOR ITS PREPARATION

[75] Inventor: Gwénolé J. C. Le Jeune, St. Julien de Concelles, France

[73] Assignee: Societe Civile Hydromer, Paris, France

[21] Appl. No.: 904,408

[22] Filed: May 10, 1978

[30] Foreign Application Priority Data

May 12, 1977 [FR] France .................................. 77 14481

[51] Int. Cl.² ............................................. A23K 1/18
[52] U.S. Cl. ................................ 426/641; 426/464; 426/473; 426/480; 426/805
[58] Field of Search ............... 426/641, 805, 464, 473, 426/479, 480

[56] References Cited

U.S. PATENT DOCUMENTS 3,741,772  6/1973  McFarland ...................... 426/480 X

*Primary Examiner*—Arthur D. Kellogg
*Attorney, Agent, or Firm*—Oblon, Fisher, Spivak, McClelland & Maier

[57] ABSTRACT

Unprepared pieces of meat, such as sheep heads, pig feet, and the like, or fishes and crustaceas, are treated by trituration with crushing under pressure so as to yield a soft product adapted to be a foodstuff, in which the elements of components stay several millimeters long, which gives the product a good aspect for appetency.

14 Claims, No Drawings

FOOD AND METHOD FOR ITS PREPARATION

The invention relates to foodstuffs and most specifically has advantageous applications in the feeding of domestic animals such as dogs and cats. The invention has for its object a new product and its preparation method. Such a product and method are also applicable to other animals as well as to human beings, and may also be applicable in other technical fields, e.g. the manufacture of proteins, fertilizers and manures.

Until now, meat containing products such as petfood for domestic animals are obtained by crushing certain meat pieces. Such meat pieces have to fulfill several conditions:

they must not contain too hard pieces so as not to damage the grinding mill, they must not be too soft so as not to obstruct the mill by stuffing, they must not contain matters not usable as foodstuff, since all the crushed product is used in the final food product.

Another drawback of products obtained in grinding mills relates to the aspect of the product, very finely divided. Such a pate is not always favourable, for commercial reasons and for grounds in connection with animals' appetency.

The foodstuff according to the invention has a fibrous structure, the component being several millimeters long, and possibly reaching 2 centimeters in some cases, what is a very good feature for the aspect as well as for the appetency. Nevertheless, it does not contain any hard or dangerous component, e.g. hair, teeth or the like.

The preparation method according to the invention allows to use cheap raw materials, what is not possible in grinding or crushing.

It is an object of the invention to provide a new product useful for preparing a foodstuff, for human beings and animals, more specifically domestic animals, such as dogs and cats.

It is another object of the invention to provide a new method for preparing such a useful product.

According to the invention, there is provided a method in which quarters of meat or whole animals are subjected to a mechanical trituration or mastication simultaneously with a crushing, while being under a heavy pressure in a phase separation press.

Phase separation presses of this kind have already been proposed in patent application Ser. No. 855,299 filed on Nov. 28, 1977 in the U.S.A. by the applicant, to be applied more particularly in the treatment of household garbage.

In such a press, in a closed, so-called pressure chamber supplied with the matter to be treated, said matter is triturated, crushed and compressed to several hundred bars by causing at least one punch to advance in the pressure chamber, and at the same time, the liquid or pasty phase of the matter thus masticated and compressed is made to flow through calibrated passages opening in the pressure chamber or in the lateral face of the punch. Then, the punch is withdrawn and the recess made by the penetration of said punch in the mass of matter in the pressure chamber is reabsorbed, reducing the volume of the pressure chamber, and the punch is again made to penetrate the mass of matter. The sliding or lateral face of the punch comprises longitudinal collecting grooves into which open a plurality of transverse channels, said collecting grooves opening into a chamber for recovering the sifted matter.

The product extracted in the grooves of the punch is the new product according to the invention.

In the machines of this kind, providing phase separation according to the extrusion capacity of the components of treated matters, the softest matters are expelled out of the mass in the form of coherent filaments of more or less great length. During the compression work there does not occur anything like the intense stirring caused by the conventional crushing. It ensues two essential features for the product: the presence of many coherent components not destroyed, and a rather heterogeneous composition of the mixture.

It is interesting to draw advantage of these new features in view of preparing such products with no equivalent in the consumer's market, owing to the cost of human intervention.

According to another feature of the invention, at least part of the various components of the final product are mixed in their raw form before compression. The meat containing portion is used in its simplest possible form so as to reduce the preparation costs, and so is the possibly present vegetable portion in many cases. The aspect of the final mixture allows to see the different components and no hard or dangerous components, such as bone or tooth splinters, fish bones, hair or the like, can be seen in the product.

Another advantage of the method of the invention is to be seen in that it is possible to use pieces of high nutritious grade, which, although being of low cost, are not, or unproperly, used presently, due to the technological difficulties.

The invention will be more fully understood by reference to the detailed description of the following examples.

EXAMPLE 1

Whole animals' heads, more particularly non prepared sheeps' heads, were treated under compression. The extrudable collected portion is substantially similar to head pate used by human beings. The portion resisting to extrusion, ejected out of the press in the form of a lump, contains the skin with the hair, the bones, the teeth and a low content of cartilage and meat.

EXAMPLE 2

Animals' feet, more precisely pig's and ox's feet were treated without any special preparation, either frozen or fresh. A red meat is obtained, with a high amount in soft cartilage in the case of pig's feet. In the press, there remain the skin, bones and hoof's horn.

EXAMPLE 3

Animal's foetus and still-born animals, mostly in form of whole beasts, were treated in the same way. The results are similar to those of example 1.

EXAMPLE 4

Little animals were treated without being cut out, more specifically chickens and rabbits. The skin, with feathers and hair remain in the "dry" portion, as well as the beaks, teeth, claws, and naturally the bones as in the other examples.

EXAMPLE 5

Long bones, and more specifically those containing marrow, have been treated. The marrow is extracted in form of long filaments retaining a certain cohesion. Marrow is also extracted in the cases of preceding examples and gives to the final product an interesting physical structure.

In the case of the five foregoing examples, the dry remaining portion is advantageously treated through thermal way for obtaining bone-black.

EXAMPLE 6

Fishes, and more particularly fishes with large heads and important bones, what reduces their commercial value, or what remains from fishes after the fillets have been removed, were treated under compression. In this case also, heads, bones and part of the skin remain in the dry portion.

EXAMPLE 7

Crustaceans, e.g. crabs, after their most valuable parts such as the nippers have been removed, are treated in the same way. The extracted meat obtained from uncured animals remains fairly firm, with a fibrous structure. The remaining shells are treated after that with interest for giving a plastic material with high grade characteristics and wholly bio-degradable.

EXAMPLE 8

The final petfood provided for animals is a mixture of various components, some of which are vegetable in most of the cases. These various components were mixed before being treated by compression and phase separation. The product obtained in the fluable portion has a favourable aspect since the parts of the various components can easily be seen in form of pieces of several millimeters.

EXAMPLE 9

Certain products present some difficulties in proceeding. The phase separation is much easier in some cases by means of a curing, complete or partial, before compression.

EXAMPLE 10

Certain products can be wholly used as foodstuff. In this case, the press is used instead of a grinding mill, and the product obtained has a better aspect.

Many other products can be treated in the same way for obtaining foodstuffs as well for human beings as for animals.

It will be understood that this invention is susceptible to modification in order to adapt to different usages and conditions, and accordingly it is desired to comprehend such modification within the invention as may fall within the scope of the appended claims.

What I claim is:

1. A method for preparing a foodstuff in the form of coherent filaments of substantial length in a phase separation press, comprising:
   simultaneously crushing and compressing whole or coarsely broken foodstuff raw material with at least one advancing punch in a closed chamber filled with said raw material under a pressure sufficient to compress and masticate soft foodstuff matter and crush hard matter in said raw material and to extrude said masticated soft matter from said press, said closed chamber and/or punch being provided with exit channels through which said masticated matter is extruded; and
   extruding the masticated soft foodstuff matter from said press.

2. The method of claim 1, wherein said punch is provided with longitudinal gooves which provide said exit channels through which said masticated matter is extruded.

3. The method of claim 1, wherein said pressure generated by the advancing punch in said press is about several hundred bars.

4. The method of claim 1, wherein said raw material is at least partially cured before the compression step.

5. The method of claim 1, wherein said foodstuff raw material is a mixture of different types of foodstuff raw materials which are subjected to said compression step, the dispersed heterogeneity of said different raw materials being observable in said foodstuff.

6. A foodstuff prepared by the method of claim 1, wherein said starting raw material is whole animal heads.

7. A foodstuff prepared by the method of claim 1, wherein the starting raw material is whole animal feet.

8. A foodstuff prepared by the method of claim 1, wherein the starting raw material is whole animal fetuses or whole still-borne animals.

9. A foodstuff prepared by the method of claim 1, wherein the starting raw material is at least one roughly prepared small animal.

10. A foodstuff prepared by the method of claim 8, wherein said small animal is a chicken or a rabbit.

11. A foodstuff prepared by the method of claim 1, wherein the starting raw material is marrow-containing bones.

12. A foodstuff prepared by the method of claim 1, wherein the starting raw material is roughly prepared fish.

13. A foodstuff prepared by the method of claim 1, wherein the starting raw material is the residue of fish remaining after the removal of filets from said fish.

14. A foodstuff prepared by the method of claim 1, wherein the starting raw material is crustaceas.

* * * * *